US012791495B2

(12) United States Patent
Fan et al.

(10) Patent No.: US 12,791,495 B2
(45) Date of Patent: Nov. 10, 2026

(54) INSPECTION METHOD FOR ELECTRONIC DEVICES

(71) Applicant: InnoLux Corporation, Miao-Li County (TW)

(72) Inventors: Kuang-Ming Fan, Miao-Li County (TW); Ju-Li Wang, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 123 days.

(21) Appl. No.: 18/630,370

(22) Filed: Apr. 9, 2024

(65) Prior Publication Data

US 2024/0377338 A1 Nov. 14, 2024

Related U.S. Application Data

(60) Provisional application No. 63/501,037, filed on May 9, 2023.

(30) Foreign Application Priority Data

Feb. 19, 2024 (CN) ........................ 202410183899.9

(51) Int. Cl.

| | |
|---|---|
| ***G01N 21/956*** | (2006.01) |
| ***G01N 21/31*** | (2006.01) |
| ***G01N 21/88*** | (2006.01) |

(52) U.S. Cl.

CPC ... *G01N 21/95684* (2013.01); *G01N 21/8806* (2013.01); *G01N 2021/3155* (2013.01); (Continued)

(58) Field of Classification Search

CPC ......... G01N 21/95684; G01N 21/8806; G01N 2021/3155; G01N 2021/8845; (Continued)

(56) References Cited

U.S. PATENT DOCUMENTS 4,999,510 A * 3/1991 Hayano ..................... G03F 1/62 250/559.39
5,245,403 A * 9/1993 Kato ...................... G01N 21/94 356/239.8

(Continued)

FOREIGN PATENT DOCUMENTS

JP 2019215225 A * 12/2019 ............ G01N 21/88
TW 202007954 A 2/2020

(Continued)

*Primary Examiner* — Monica T Taba

(74) *Attorney, Agent, or Firm* — Muncy, Geissler, Olds & Lowe, P.C.

(57) ABSTRACT

An inspection method for electronic devices includes the steps of: providing an object under test; inspecting the object under test through an inspection system having an optical apparatus, including the steps of: using the optical apparatus to provide a first inspection light to inspect a first position of the object under test, and then receiving a first reflection light for being recorded in a controller; moving the optical apparatus; and using the optical apparatus to provide a second inspection light to inspect the first position of the object under test, and then receiving a second reflection light for being recorded in the controller; and determining whether there is an abnormality through the first reflection light and the second reflection light.

14 Claims, 13 Drawing Sheets

(52) U.S. Cl.
CPC ................ *G01N 2021/8845* (2013.01); *G01N 2201/025* (2013.01)

(58) Field of Classification Search
CPC ........... G01N 2201/025; G01N 21/956; G01N 21/55; G01N 21/01; G01N 21/88; G01N 2021/0181
See application file for complete search history.

(56) References Cited

U.S. PATENT DOCUMENTS

| | | | | |
|---|---|---|---|---|
| 2004/0207836 | A1* | 10/2004 | Chhibber | G01N 21/8806 356/237.4 |
| 2021/0072166 | A1* | 3/2021 | Uher | H04N 13/344 |
| 2021/0364476 | A1* | 11/2021 | Safai | G01N 29/2418 |

FOREIGN PATENT DOCUMENTS

| | | | | |
|---|---|---|---|---|
| TW | 202242399 | A | 11/2022 | |
| WO | WO-2020152866 | A1 * | 7/2020 | G01N 21/956 |

* cited by examiner

INSPECTION METHOD FOR ELECTRONIC DEVICES

CROSS-REFERENCE TO RELATED APPLICATIONS

This application claims the benefit of filing date of U.S. Provisional Application Ser. No. 63/501,037 filed May 9, 2023 under 35 USC § 119 (e)(1), and also claims the benefit of the Chinese Patent Application Serial Number 202410183899.9, filed on Feb. 19, 2024, the subject matter of which is incorporated herein by reference.

BACKGROUND

Field of the Disclosure

The present disclosure relates to the technical field of manufacture of electronic devices and, more particularly, to an inspection method for electronic devices.

Description of Related Art

At present, when electronic devices are inspected during the manufacturing process of electronic devices, if using the human-based inspection station to inspect whether the electronic device is defective, it may cause misjudgment due to the height and the fatigue state of the personnel, and there is no image record provided for tracing back the status of the manufacturing process at that time. If using existing inspection equipment to perform inspection, since the angles of the light source and camera of the inspection equipment are fixed or at specific angles, the inspection defense range is extremely limited, resulting in poor defect detection capability.

Therefore, there is a need to provide an inspection method for electronic devices to alleviate and/or obviate the aforementioned problems.

SUMMARY

The present disclosure provides an inspection method for electronic devices, which comprises the steps of: providing an object under test; inspecting the object under test through an inspection system having an optical apparatus, including the steps of: using the optical apparatus to provide a first inspection light for inspecting a first position of the object under test, and then receive a first reflection light for being recorded in a controller; moving the optical apparatus; and using the optical apparatus to provide a second inspection light for inspecting the first position of the object under test, and then receive a second reflection light for being recorded in the controller; and determining whether there is an abnormality through the first reflection light and the second reflection light.

The present disclosure further provides an inspection method for electronic devices, which comprises the steps of: providing an object under test; inspecting the object under test through an optical apparatus, including: selecting a first light source to provide a first inspection light for inspecting a first position of the object under test, and then receive a first reflection light for being recorded in a controller; and selecting a second light source to provide a second inspection light for inspecting the first position of the object under test, and then receive a second reflection light for being recorded in the controller; and determining whether there is an abnormality through the first reflection light and the second reflection light.

Other novel features of the disclosure will become more apparent from the following detailed description when taken in conjunction with the accompanying drawings.

DETAILED DESCRIPTION OF EMBODIMENT

Figure 1A:
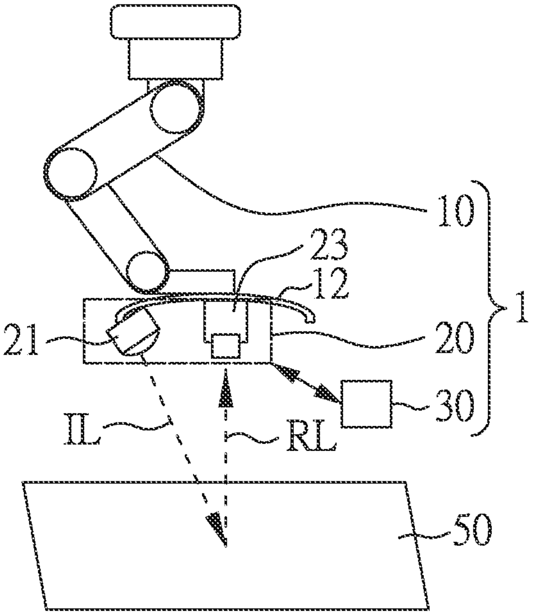
FIG. 1A shows a schematic diagram of an inspection system used to implement the inspection method of the present disclosure, wherein the inspection system is a top-mounted inspection system.

Different embodiments of the present disclosure are provided in the following description. These embodiments are meant to explain the technical content of the present disclosure, but not meant to limit the scope of the present disclosure. A feature described in an embodiment may be applied to other embodiments by suitable modification, substitution, combination, or separation.

It should be noted that, in the present specification, when a component is described to “comprise”, “have”, “include”

an element, it means that the component may include one or more of the elements, and the component may include other elements at the same time, and it does not mean that the component has only one of the element, except otherwise specified.

Moreover, in the present specification, the ordinal numbers, such as "first" or "second", are only used to distinguish a plurality of elements having the same name, and it does not means that there is essentially a level, a rank, an executing order, or an manufacturing order among the elements, except otherwise specified. The ordinal numbers of the elements in the specification may not be the same in claims. For example, a "second" element in the specification may be a "first" element in the claims.

In the present specification, except otherwise specified, the feature A "or" or "and/or" the feature B means only the existence of the feature A, only the existence of the feature B, or the existence of both the features A and B. The feature A "and" the feature B means the existence of both the features A and B.

Moreover, in the present specification, the terms, such as "top", "upper", "bottom", "front", "back", or "middle", as well as the terms, such as "on", "above", "over", "under", "below", or "between", are used to describe the relative positions among a plurality of elements, and the described relative positions may be interpreted to include their translation, rotation, or reflection.

Furthermore, the terms recited in the specification and the claims such as "above", "over", "on", "below", or "under" are intended that an element may not only directly contacts other element, but also indirectly contact the other element.

Furthermore, the term recited in the specification and the claims such as "connect" is intended that an element may not only directly connect to other element, but also indirectly connect to other element. On the other hand, the terms recited in the specification and the claims such as "electrically connect" and "couple" are intended that an element may not only directly electrically connect to other element, but also indirectly electrically connect to other element.

In addition, the electronic device disclosed in the present disclosure may include a display device, a backlight device, an antenna device, a sensing device or a tiled device, but not limited thereto. The electronic device may be a bendable or flexible electronic device. The display device may be a non-self-luminous display device or a self-luminous display device. The antenna device may be a liquid crystal type antenna device or a non-liquid crystal type antenna device. The sensing device may be a sensing device that senses capacitance, light, heat energy or ultrasonic waves, but not limited thereto. The electronic components may include passive components and active components, such as capacitors, resistors, inductors, diodes, transistors, etc. The diodes may include light emitting diodes or photodiodes. The light emitting diode may include, for example, an organic light emitting diode (OLED), a sub-millimeter light emitting diode (mini LED), a micro light emitting diode (micro LED) or a quantum dot light emitting diode (quantum dot LED), but not limited thereto. The tiled device may be, for example, a display tiled device or an antenna tiled device, but not limited thereto. It should be noted that the electronic device may be any combination of the above, but not limited thereto.

In the present specification, except otherwise specified, the terms (including technical and scientific terms) used herein have the meanings generally known by a person skilled in the art. It should be noted that, except otherwise specified in the embodiments of the present disclosure, these terms (for example, the terms defined in the generally used dictionary) should have the meanings identical to those skilled in the art, the background of the present disclosure or the context of the present specification, and should not be read by an ideal or over-formal way.

The inspection method of the present disclosure is used in the manufacture of electronic devices to inspect whether the object under test (that is, the manufactured electronic device) is defective. The object under test may include a semiconductor wafer, a diced wafer, a display panel or device, a packaging component, a fan-out/in circuit structure, etc., but it is not limited thereto, and the inspection method is implemented with an inspection system. FIG. 1A shows a schematic diagram of the inspection system 1 used to implement the inspection method of the present disclosure, wherein the inspection system 1 includes a controller 30, at least one robotic arm 10, and an optical apparatus 20 provided on each robotic arm 10. As shown, the optical apparatus 20 is coupled to the controller 30 and disposed at an end portion of the robotic arm 10. The optical apparatus 20 may include a light source device 21 and a camera device 23, or may only include a light source device 21, or may only include a camera device 23, wherein the light source device 21 and the camera device 23 are, for example but not limited to, disposed at a carrying portion 12 on the free end of the robotic arm 11. The light source device 21 is used to provide inspection light IL to illuminate the object 50 under test, and the light source device 21 may be switched to provide a variety of light sources with different wavelengths. The camera device 23 is used to receive the reflection light RL generated by the object 50 under test being illuminated by the light source device 21. The robotic arm 10 may be a robotic arm with multi-axis degree of freedom, which is composed of multiple servo rotation axes (joints) and rigid connections between axes, such as but not limited to a robotic arm with 6-axis degree of freedom, so as to move the light source device 21 and the camera device 23 of the optical apparatus 20 to any position in the inspection space to detect the object 50 under test. Accordingly, the optical apparatus 20 may inspect the object 50 under test at different angles, and/or different positions, and/or different light source wavelengths, so as to improve the defect detection rate.

Figure 1B:
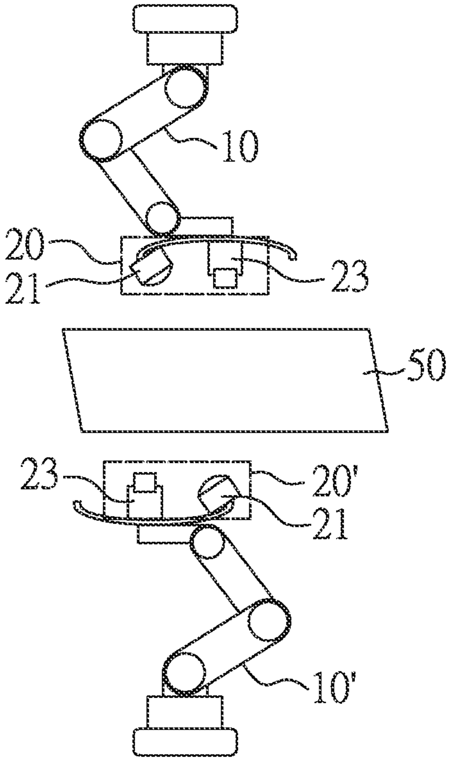
FIG. 1B shows another schematic diagram of an inspection system used to implement the inspection method of the present disclosure, wherein the inspection system is a top-down-mounted inspection system.
Figure 1C:
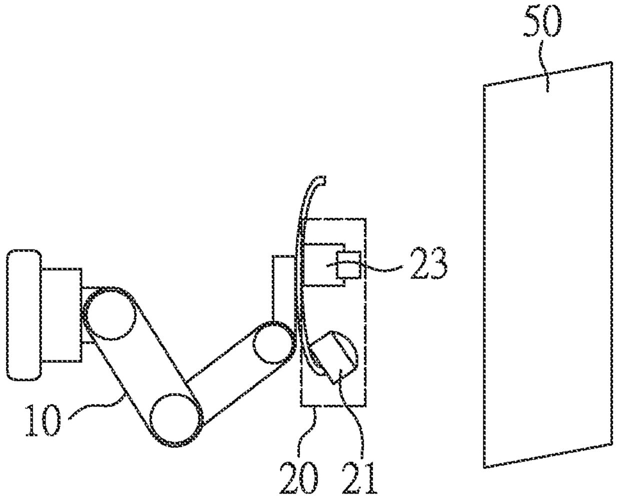
FIG. 1C shows a schematic diagram of an inspection system used to implement the inspection method of the present disclosure, wherein the inspection system is a side-mounted inspection system.
Figure 1D:
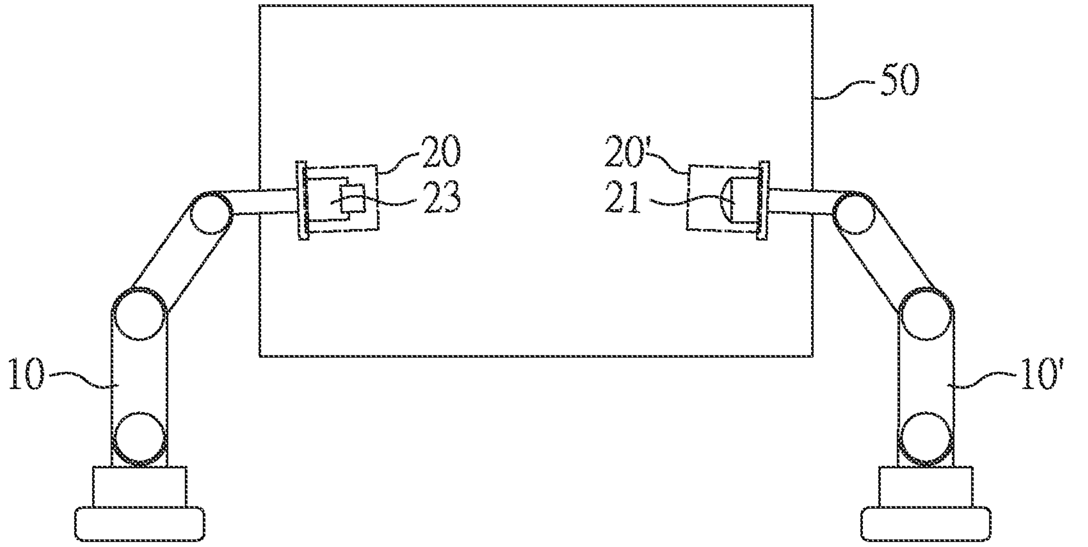
FIG. 1D shows a schematic diagram of an inspection system used to implement the inspection method of the present disclosure, wherein the inspection system is a large-scale inspection system.

In the embodiment shown in FIG. 1A, the optical apparatus 20 is provided in a top-mounted inspection system 1 disposed above the object 50 under test, which may inspect the object 50 under test, for example, inspect a surface of the object 50 under test, but it is not limited thereto. In addition, in the present disclosure, the inspection method may also be performed by using a top-down-mounted inspection system as shown in FIG. 1B, which has two optical apparatuses 20, 20' respectively provided on two robotic arms 10, 10', and the two optical apparatuses 20, 20' are respectively arranged above and below the object 50 under test. That is, in the normal direction of the object 50 under test, the object 50 under test is disposed between the two optical apparatuses 20, 20', wherein the two optical apparatuses 20, 20' may be overlapped or misaligned with each other. Each optical apparatus 20, 20' includes a camera device 21 and a light source device 23 provided on the robotic arm 10, 10', and may simultaneously inspect the upper and lower surfaces of the object 50 under test. Alternatively, the inspection method may also be performed by using a side-mounted inspection system as shown in FIG. 1C, in which, since the object 50 under test is in an upright configuration, the optical apparatus 20 is disposed on the side of the object 50 under test to inspect one surface of the object 50 under test. Alternatively, the inspection method may also be performed by a large-scale inspection system as shown in FIG. 1D, which has two optical apparatuses 20, 20' respectively provided on the two robotic arms 10, 10', and the two optical apparatuses 20, 20' are respectively disposed at different locations above the object 50 under test, wherein the optical apparatus 20 is equipped with a camera device 23, and the optical apparatus 20' is equipped with a light source device 21, so as to use large-angle inspection light to inspect a large-scale object 50 under test, such as a large-generation glass substrate 51 and the like, for determining Mura defects, for example, but the present disclosure is not limited thereto. For convenience of explanation, in the following description of the present disclosure, the inspection system is exemplified mainly by the top-mounted inspection system.

Figure 2:
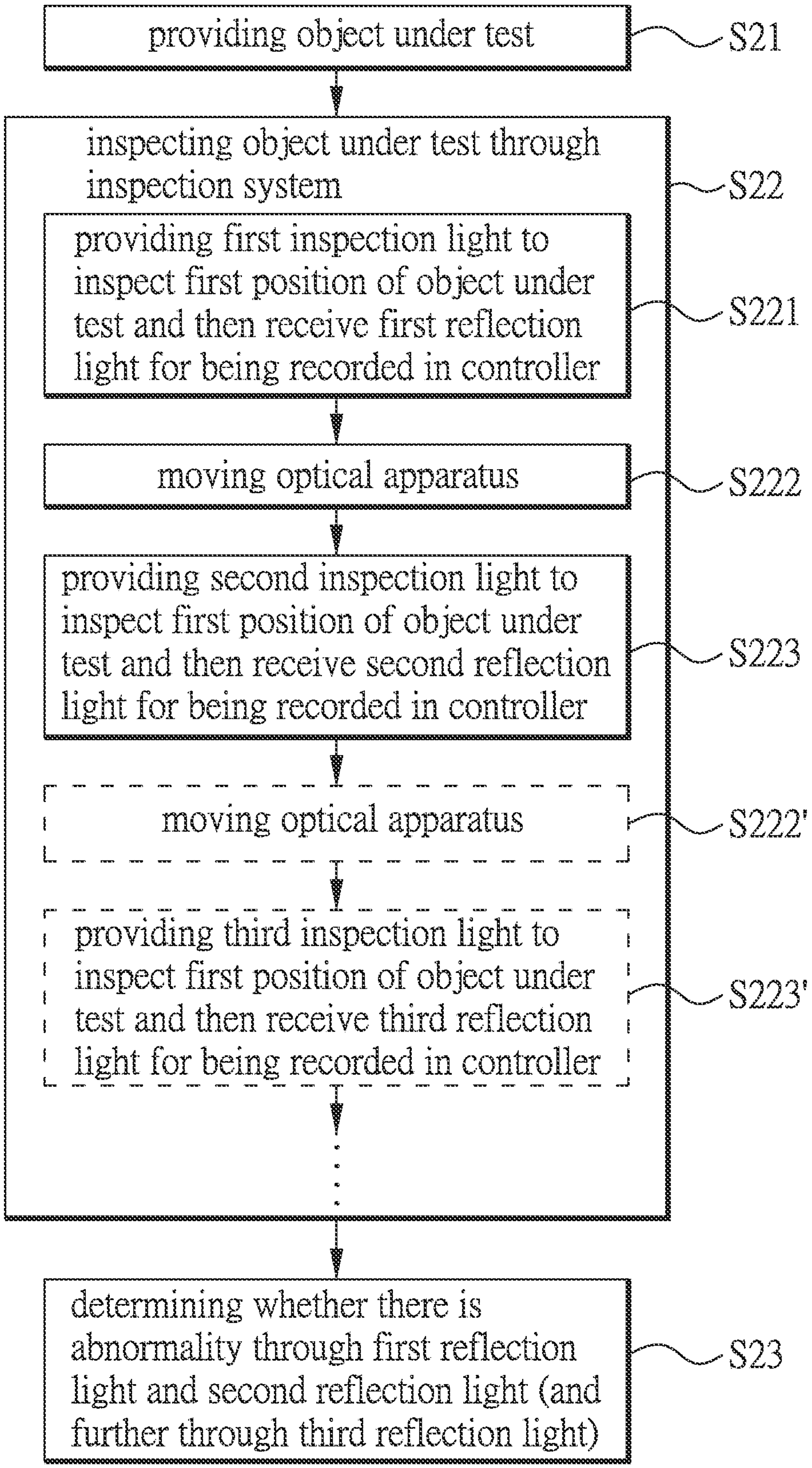
FIG. 2 is a flow chart of the inspection method according to an embodiment of the present disclosure.
Figure 3A:
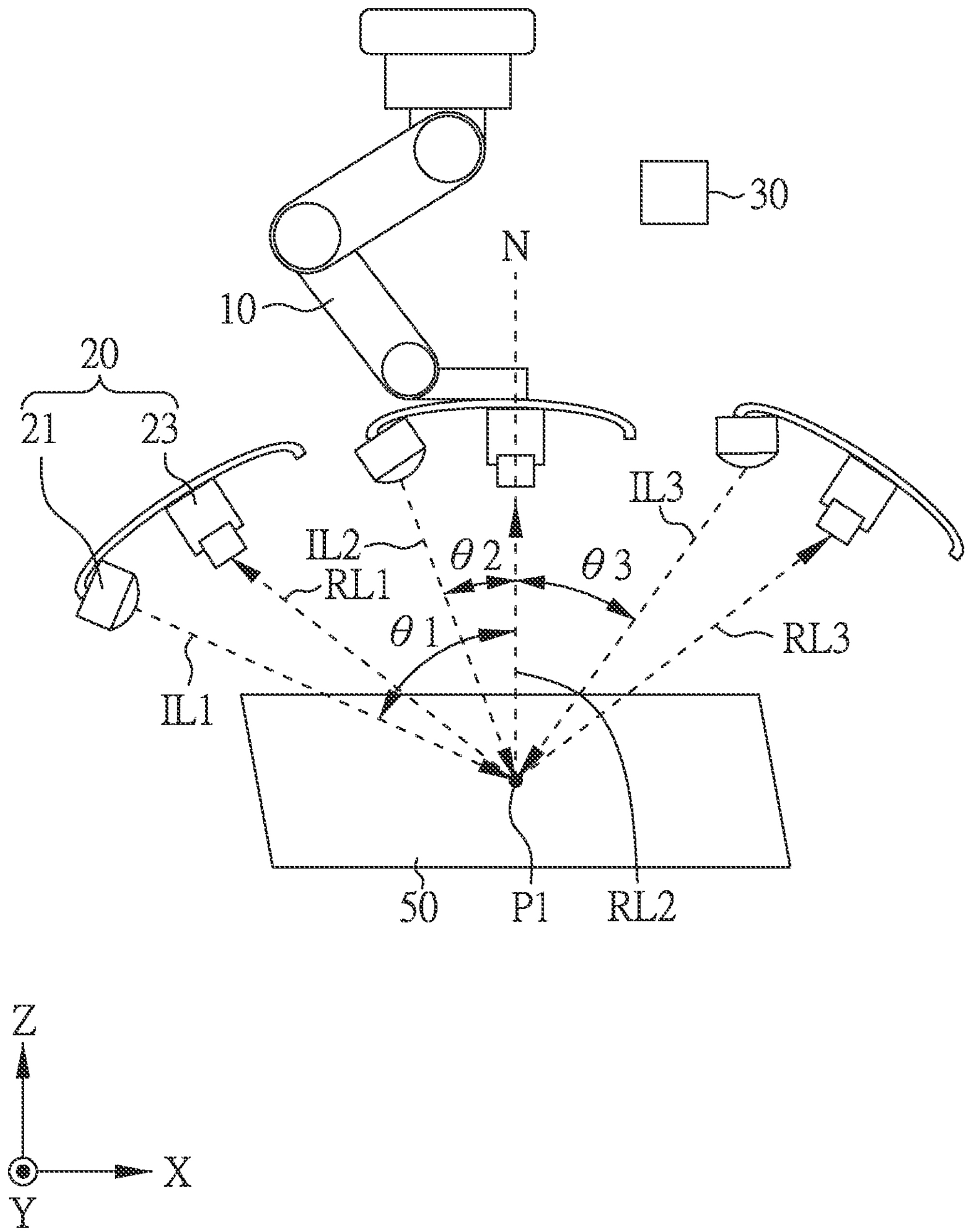
FIG. 3A and FIG. 3B are schematic diagrams showing the operation of an inspection system corresponding to the inspection method of the present disclosure shown in FIG. 2.
Figure 3B:
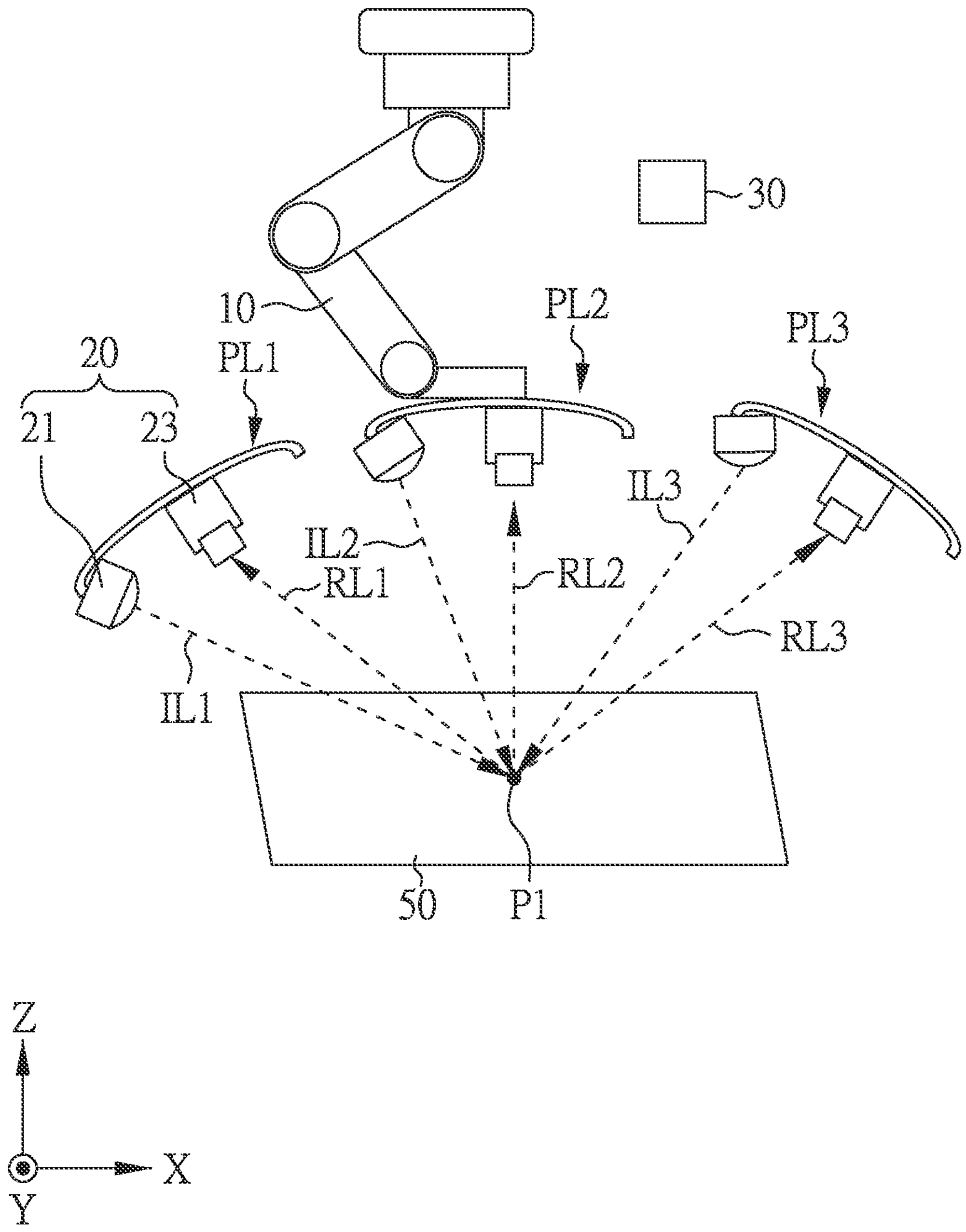

FIG. 2 is a flow chart of the inspection method according to an embodiment of the present disclosure, and please also refer to FIG. 3A and FIG. 3B, which are schematic diagrams showing the operation of an inspection system 1 corresponding to the inspection method of the present disclosure. In step S21, an object 50 under test is first provided. Next, in step S22, the object 50 under test is inspected through the detection system 1. In this step, the light source device 21 of the optical apparatus 20 is first used to provide a first inspection light IL1 for inspecting a first position P1 of the object 50 under test, and then the camera device 23 of the optical apparatus 20 receives a first reflection light RL1 for being recorded in the controller 30 (step S221); then, the optical apparatus 20 is moved by the robotic arm 10 (step S222); then, the light source device 21 of the optical apparatus 20 is used to provide a second inspection light IL2 for inspecting the first position P1 of the object 50 under test, and then the camera device 23 of the optical apparatus 20 is used to receive a second reflection light RL2 for being recorded in the controller 30 (step S223). That is, the optical apparatus 20 is coupled to the controller 30 and, after the reflection light is received by the lens or related optical components, the information is transmitted to the controller 30. Accordingly, in step S23, the controller 23 determines whether there is an abnormality in the object 50 under test through the first reflection light RL1 and the second reflection light RL2. In the present disclosure, the "move" as referred to may include positional differences along the X-axis, Y-axis or Z-axis or rotations. In one embodiment, it means that, after the object is moved, the first position of the object is different from the second position of the object, wherein the position includes an angle, a coordinate axis, a combination of the above, or other position-related parameters.

In one embodiment, as shown in FIG. 2 and FIG. 3A, in step S221, there is a first included angle θ1 between the first inspection light IL1 provided by the light source device 21 of the optical apparatus 20 and the normal direction (N) of the object 50 under test (that is, the Z-axis direction). After moving the optical apparatus 20 (step S222), there is a second included angle θ2 between the second inspection light IL2 provided by the light source device 21 of the optical apparatus 20 and the normal direction (N) of the object 50 under test, and the first included angle θ1 is different from the second included angle θ2. Therefore, with the combination of different image information of the first position P1 of the object 50 under test provided by the first reflection light RL1 and the second reflection light RL2, it is able to increase the inspection defense range and effectively improve the defect detection capability. In addition, it is noted that, in the present disclosure, the first included angle θ1 being different from the second included angle θ2 does not necessarily mean that the value of the first included angle θ1 is different from the value of the second included angle θ2, while it may mean that the value of the first included angle θ1 is the same as the value of the second included angle θ2, but the orientations of the first included angle θ1 and the second included angle θ2 in the X-Y-Z three-dimensional space are different. For example, the first included angle θ1 is an angle of 45 degrees on the X-Y plane in space, and the second included angle θ2 is an angle of 45 degrees on the Y-Z plane of space. However, the present disclosure is not limited thereto.

In one embodiment, as shown in FIG. 2 and FIG. 3B, in step S221, the first inspection light IL1 provided by the light source device 21 of the optical apparatus 20 comes from a first light source position PL1 in space and, after moving the optical apparatus 20 (step S222), the second inspection light IL2 provided by the optical apparatus 20 comes from a second light source position PL2 in space, wherein the first light source position PL1 is different from the second light source position PL2. Therefore, with the combination of the different image information of the first position P1 of the object 50 under test provided by the first reflection light RL1 and the second reflection light RL2, it is able to increase the inspection defense range and effectively improve the defect detection capability. The light source position may include an angle, a coordinate axis, a combination of the above, or other position-related parameters, or it may refer to the position that provides the light source or the position from which the light is emitted.

Furthermore, in one embodiment, please refer to FIG. 2 and FIG. 3A and FIG. 3B again. In step S22, after the step of using the optical apparatus 20 to provide the second inspection light IL2 and receive the second reflection light RL2 (that is, after step S223), steps S222 and S223 may be repeatedly performed (that is, steps S222' and S223' marked in the figure), in which the robotic arm 11 is used to move the optical apparatus 20 (step S222'), and the light source device 21 of the optical apparatus 20 is used to provide a third inspection light IL3 to inspect the first position P1 of the object 50 under test and the camera device 23 of the optical apparatus 20 is used to receive a third reflection light RL3 for being recorded in the controller 30 (step S223'). Accordingly, in step S23, the controller 30 determines whether there is an abnormality in the object 50 under test through the first reflection light RL1, the second reflection light RL2, and the third reflection light RL3. In addition, the aforementioned steps S222 and S223 may also be repeated multiple times to provide more inspection lights IL and receive more reflection lights RL so as to enhance the inspection defense range and the defect detection capability. In other words, the defect mode may be determined by providing at least two reflection lights at different positions that are recorded in the controller for being compared with standard data in the database. As a result, the defect detection capability of the electronic device may be improved or the probability of false detection may be reduced, thereby improving the reliability of the electronic device or improving the production efficiency.

In the embodiment of using the optical apparatus 20 to provide the first inspection light IL1, the second inspection light IL2 and the third inspection light IL3 to inspect the object 50 under test and receive the first reflection light RL1, the second reflection light RL2 and the third reflection light RL3 to determine whether there is an abnormality, as shown in FIG. 3A, there is a first included angle θ1 between the first inspection light IL1 and the normal direction (N) of the object 50 under test, there is a second included angle θ2 between the second inspection light IL2 and the normal direction (N) of the object 50 under test, and there is a third included angle θ3 between the third inspection light IL3 and the normal direction (N) of the object 50 under test, wherein the first included angle θ1, the second included angle θ2 and the third included angle θ3 are different from each other. Moreover, as mentioned above, the first included angle θ1, the second included angle θ1 and the third included angle θ1 being different from each other refers to that the values or the orientations in space of the three angles are different from each other. Alternatively, in the embodiment of using the optical apparatus 20 to provide the first inspection light IL1, the second inspection light IL2 and the third inspection light IL3 to inspect the object 50 under test and receive the first reflection light RL1, the second reflection light RL2 and the third reflection light RL3 for determining whether there is an abnormality, as shown in FIG. 3B, the first inspection light IL1 comes from a first light source position PL1 in space, the second inspection light IL2 comes from a second light source position PL2 in space, the third inspection light IL3 comes from a third light source position PL3 in space, and the first light source position PL1, the second light source position PL2 and the third light source position PL3 are different from each other.

Figure 4:
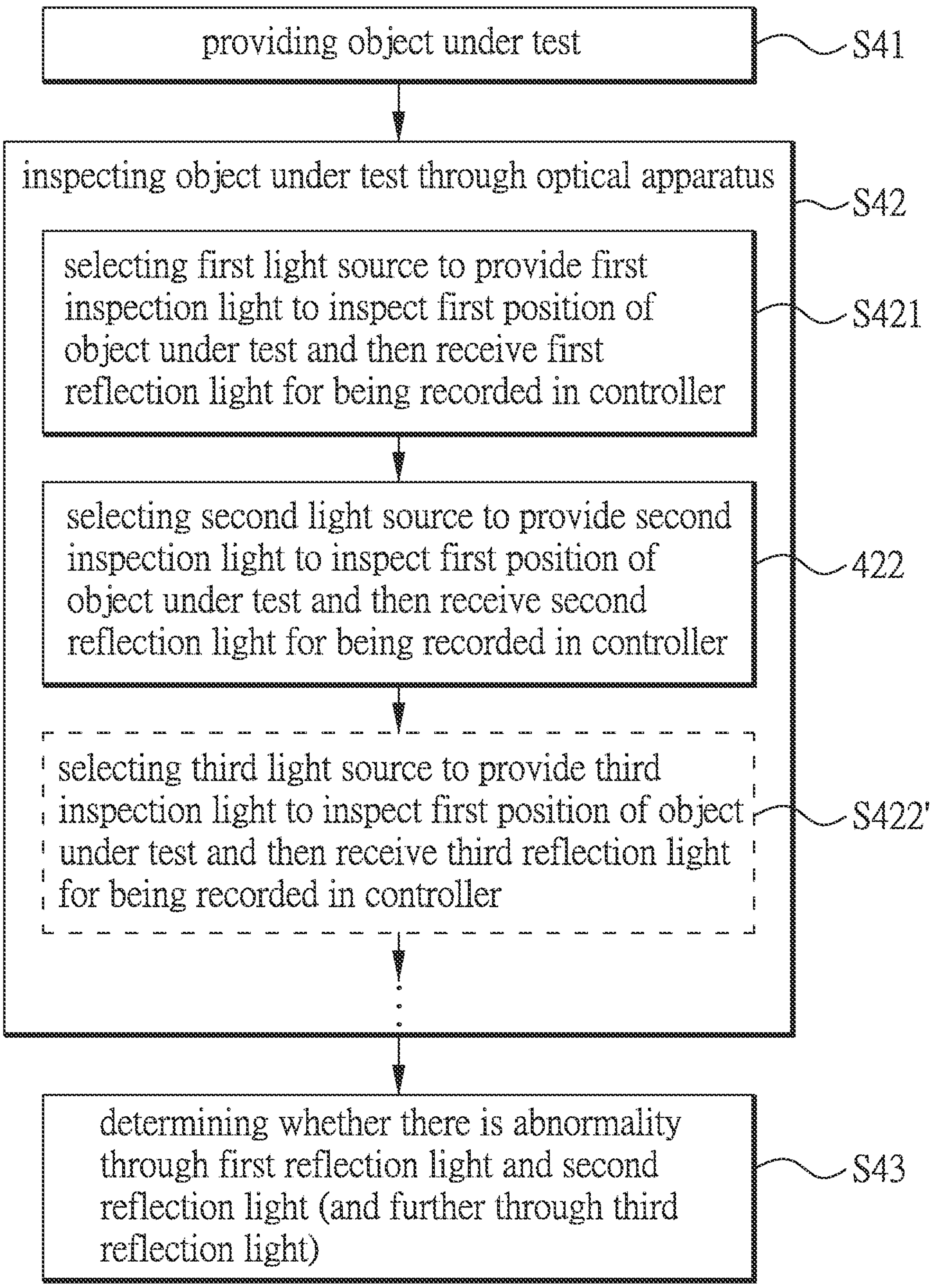
FIG. 4 is a flow chart of the inspection method according to another embodiment of the present disclosure.
Figure 5:
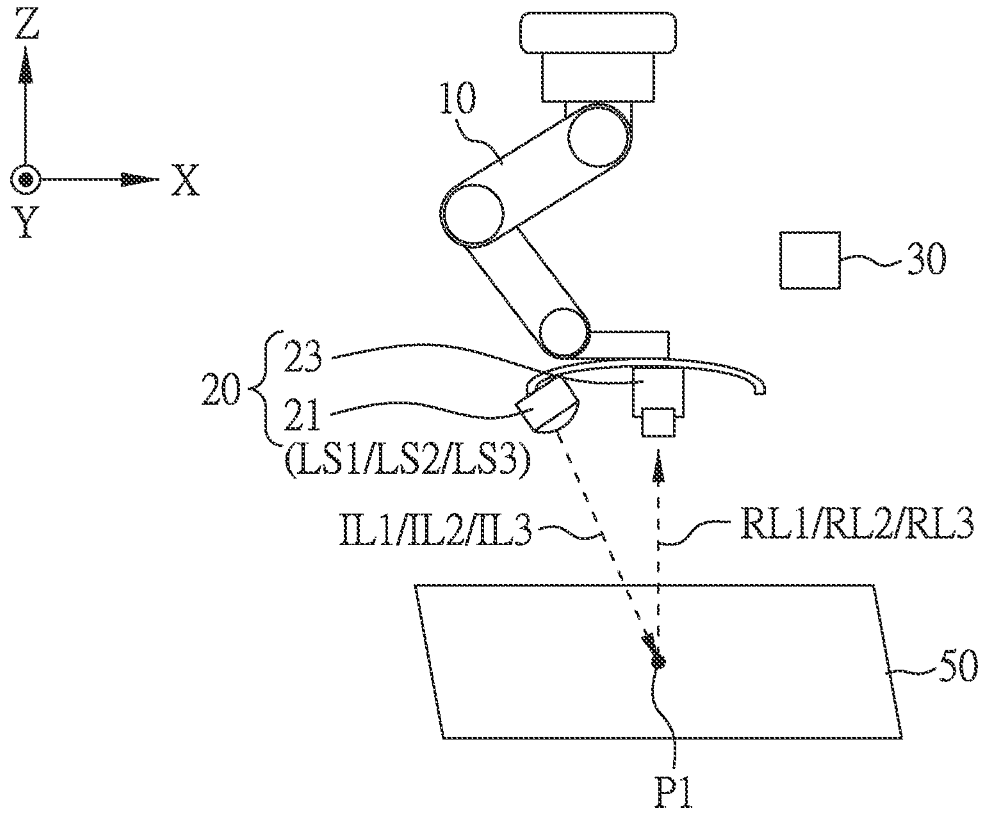
FIG. 5 is a schematic diagram showing the operation of an inspection system corresponding to the inspection method of the present disclosure shown in FIG. 4.

FIG. 4 is a flow chart of the inspection method according to another embodiment of the present disclosure, and please also refer to FIG. 5 which is a schematic diagram showing the operation of an inspection system 1 corresponding to the inspection method of the present disclosure. In step S41, an object 50 under test is first provided. Next, in step S42, the optical apparatus 20 is used to inspect the object 50 under test. In this step, the optical apparatus 20 first selects a first light source LS1 to provide a first inspection light IL1 for inspecting a first position P1 of the object 50 under test, and then receives a first reflection light RL1 for being recorded in the controller 30 (step S421). Then, the optical apparatus 20 selects a second light source LS2 to provide a second inspection light IL2 for inspecting the first position P1 of the object 50 under test, and the receives a second reflection light RL2 for being recorded in the controller 30 (step S422). In steps S421 and S422, the light source device 21 of the optical apparatus 20 may use multiple filters to provide light sources of different wavelengths (as described in FIG. 6A and FIG. 6B), or the light source device 21 itself may be controlled to generate light sources of different wavelengths, while it is not limited thereto. The selected light sources LS1 and LS2 may be visible light lamps or invisible light IR lamps (such as near infrared (NIR), short wave infrared (SWIR), etc.). Accordingly, in step S43, the controller 30 determines whether there is an abnormality in the object 50 under test through the first reflection light RL1 and the second reflection light RL2.

In one embodiment, as shown in FIG. 4 and FIG. 5, in step S421, the first inspection light IL1 provided by the optical apparatus 20 has a first wavelength, the second inspection light IL2 provided by the optical apparatus 20 has a second wavelength, and the first wavelength is different from the second wavelength. Therefore, with the combination of the different image information of the first position P1 of the object 50 under test provided by the first inspection light IL1 and the second inspection light IL2 of different wavelengths, it is able to increase the inspection defense range and effectively improve the defect detection capability. Furthermore, since the selected light sources LS1 and LS2 may be visible light lamps or invisible light lamps (such as infrared light lamps), it is able to support the inspection of different objects 50 under test (such as but not limited to display panels, sub-millimeter light-emitting diode (mini LED) panels, micro light-emitting diode (micro LED) panels, semiconductor wafers, diced wafers, packaging, panel level packaging (PLP), etc.), and achieve high penetrating power to inspect internal chipping or burrs at the edge, and inspect abnormal glue residues in the packaging process, etc.

Furthermore, in one embodiment, please refer to FIG. 4 again. In step S42, after selecting the second light source LS2 to provide a second inspection light IL2 and receiving the second reflection light RL2 (that is, after step S422), it may repeatedly execute step S422 (that is, step S422' marked in the figure), so that the optical apparatus 20 selects a third light source LS3 to provide a third inspection light IL3 for inspecting the first position P1 of the object 50 under test, and then receives a third reflection light RL3 for being recorded in the controller 30 (step S422'). Accordingly, in step S43, the controller 30 determines whether there is an abnormality in the object 50 under test through the first reflection light RL1, the second reflection light RL2, and the third reflection light RL3. In addition, the aforementioned step S422 may also be repeatedly executed multiple times to enhance the inspection defense range and defect detection capability by providing more inspection lights IL and receiving more reflection lights RL.

In the embodiment of providing the first inspection light IL1, the second inspection light IL2 and the third inspection light IL3 to inspect the object 50 under test and receiving the first reflection light RL1, the second reflection light RL2 and the third reflection light RL3 to determine whether there is an abnormality, the first inspection light IL1 has a first wavelength, the second inspection light IL2 has a second wavelength, the third inspection light IL3 has a third wavelength, and the first wavelength, the second wavelength and the third wavelengths are different from each other.

Figure 6A:
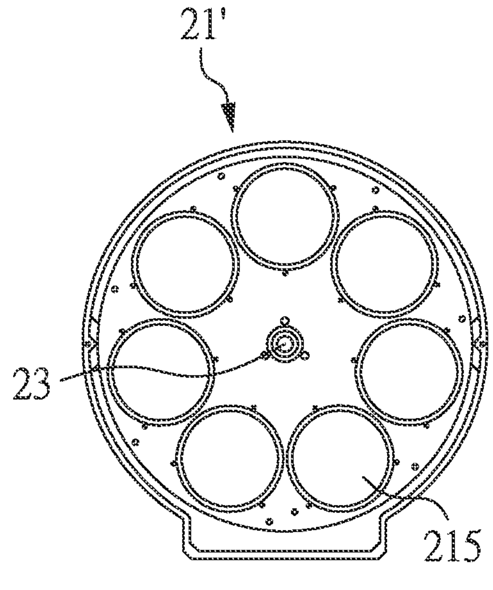
FIG. 6A and FIG. 6B respectively show the front side schematic diagram and the structural schematic diagram of the optical apparatus of the inspection system.
Figure 6B:
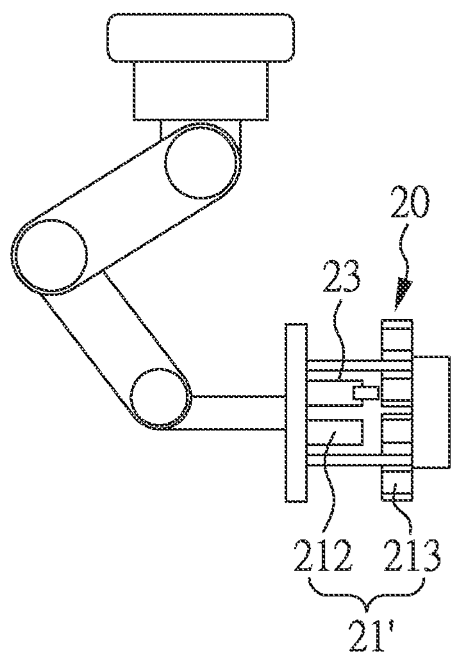

FIG. 6A and FIG. 6B respectively show the front side schematic diagram and the structural schematic diagram of an optical apparatus 20 according to an embodiment of the present disclosure. In order to enable the optical apparatus 20 to select different light sources, the light source device 21 of the optical apparatus 20 is a changeable light source device 21', that is, the optical apparatus 20 includes a camera device 23 and a changeable light source device 21'. The changeable light source device 21' may selectively provide light sources of different wavelengths. As shown, the changeable light source device 21' includes a lamp 212 and a filter wheel 213. The camera device 23 is disposed at the center of the filter wheel 213. The lamp 212 is disposed beside the camera device 23, and a plurality of filters 215 are disposed at the periphery of the filter wheel 213, so that, when rotating the filter wheel 213, one filter 215 may be aligned with the lamp 212 to achieve the purpose of selecting and providing light sources with different wavelengths.

Figure 7:
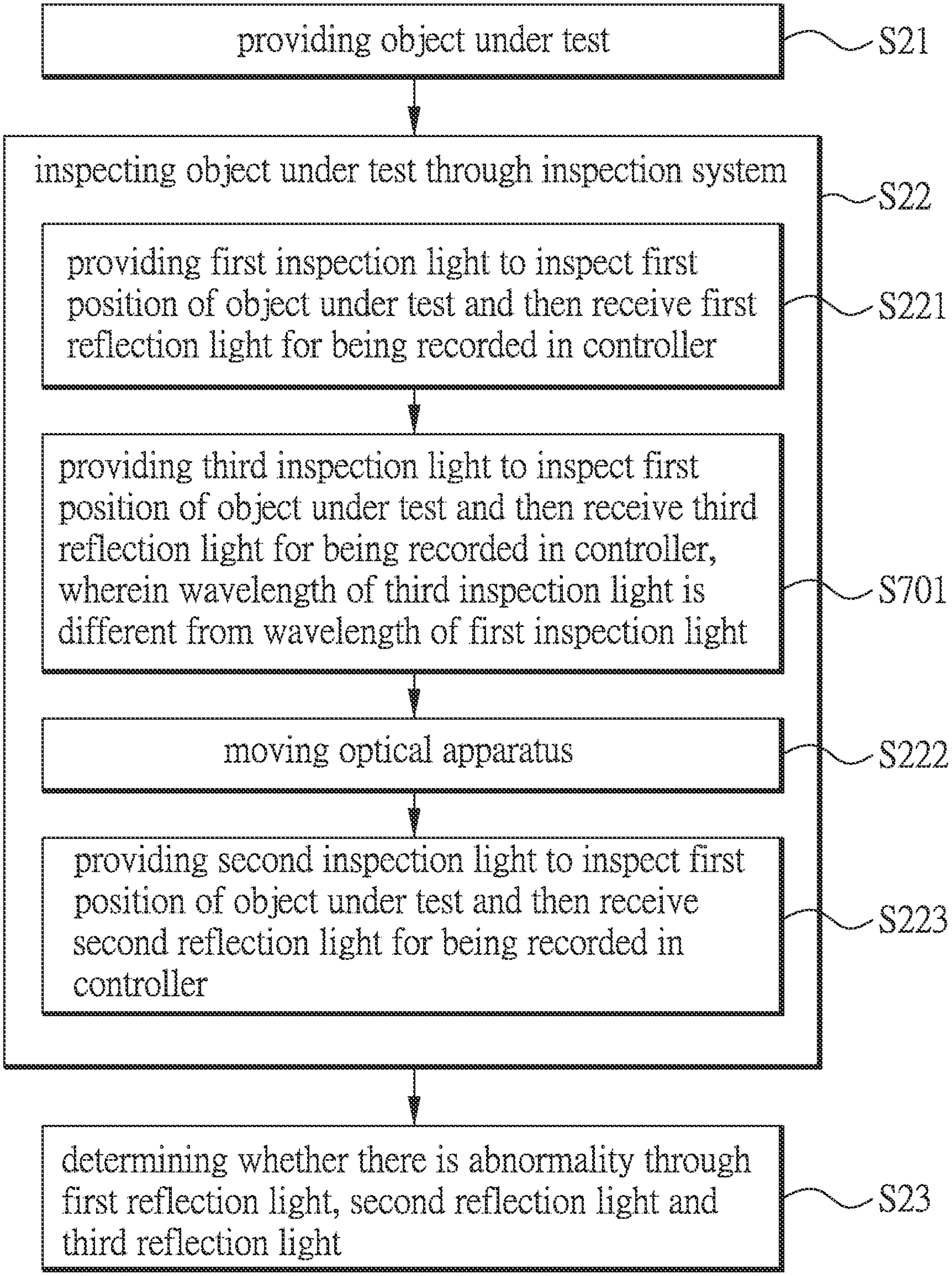
FIG. 7 is a flow chart of the inspection method according to still another embodiment of the present disclosure.
Figure 8:
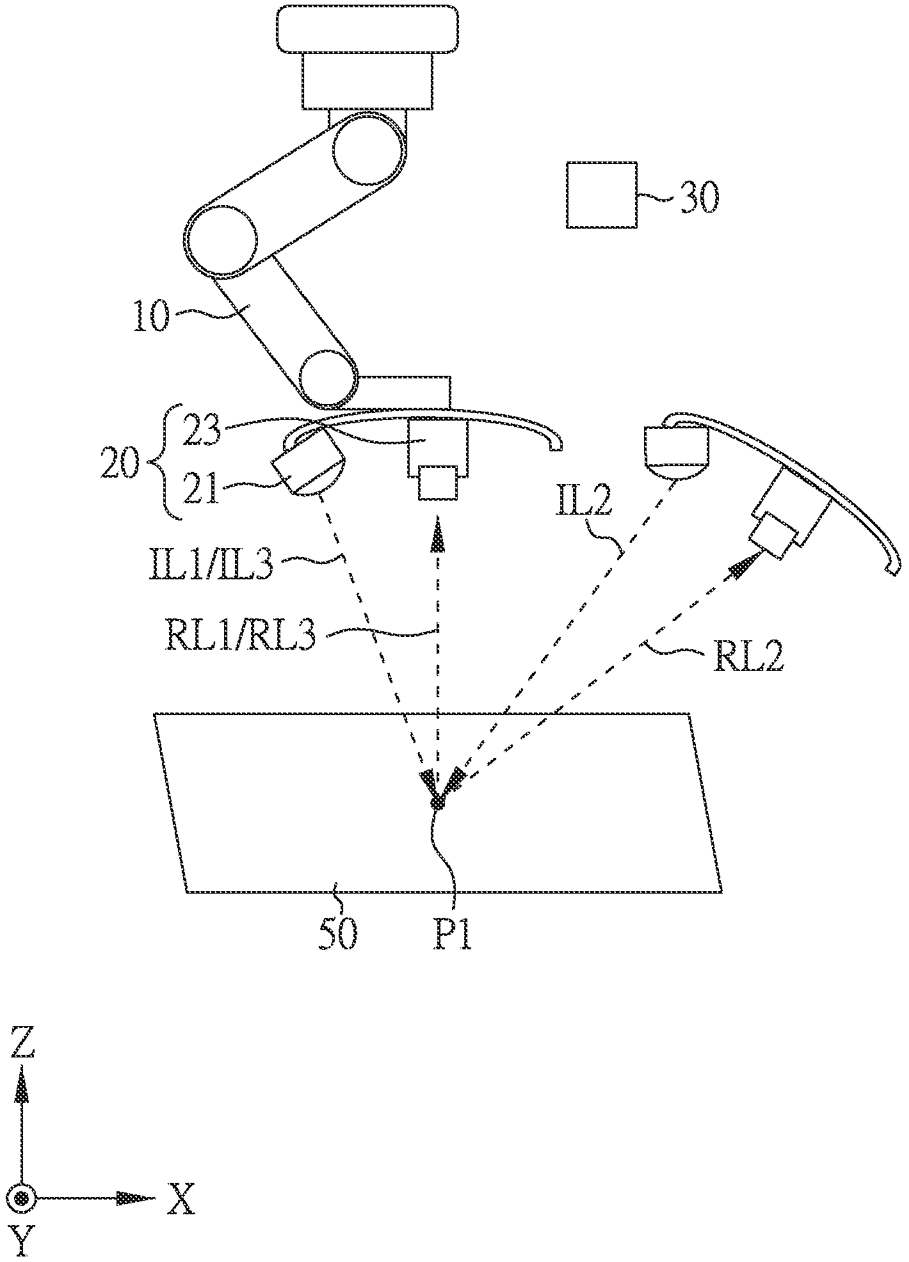
FIG. 8 is a schematic diagram showing the operation of an inspection system corresponding to the inspection method of the present disclosure shown in FIG. 7.

FIG. 7 is a flow chart of the inspection method according to still another embodiment of the present disclosure, and please also refer to FIG. 8 which is a schematic diagram showing the operation of the inspection system 1 corresponding to the inspection method of the present disclosure, wherein the process of FIG. 7 is similar to that of FIG. 2, and thus only the differences will be described below. In FIG. 7, step S701 is further provided between the step of using the optical apparatus 20 to provide a first inspection light IL1 (that is, step S221) and the step of moving the optical apparatus 20 (that is, step S222), in which the optical apparatus 20 provides a third inspection light IL3 to inspect the first position P1 of the object 50 under test, and then receives a third reflection light RL3 for being recorded in the controller 30, where the wavelength of the third inspection light IL3 is different from the wavelength of the first inspection light IL1. Moreover, the step of determining whether there is an abnormality (that is, step S23) is made to determine whether there is an abnormality in the object 50 under test through the first reflection light RL1 and the second reflection light RL2, and further through the third reflection light RL3.

Figure 9:
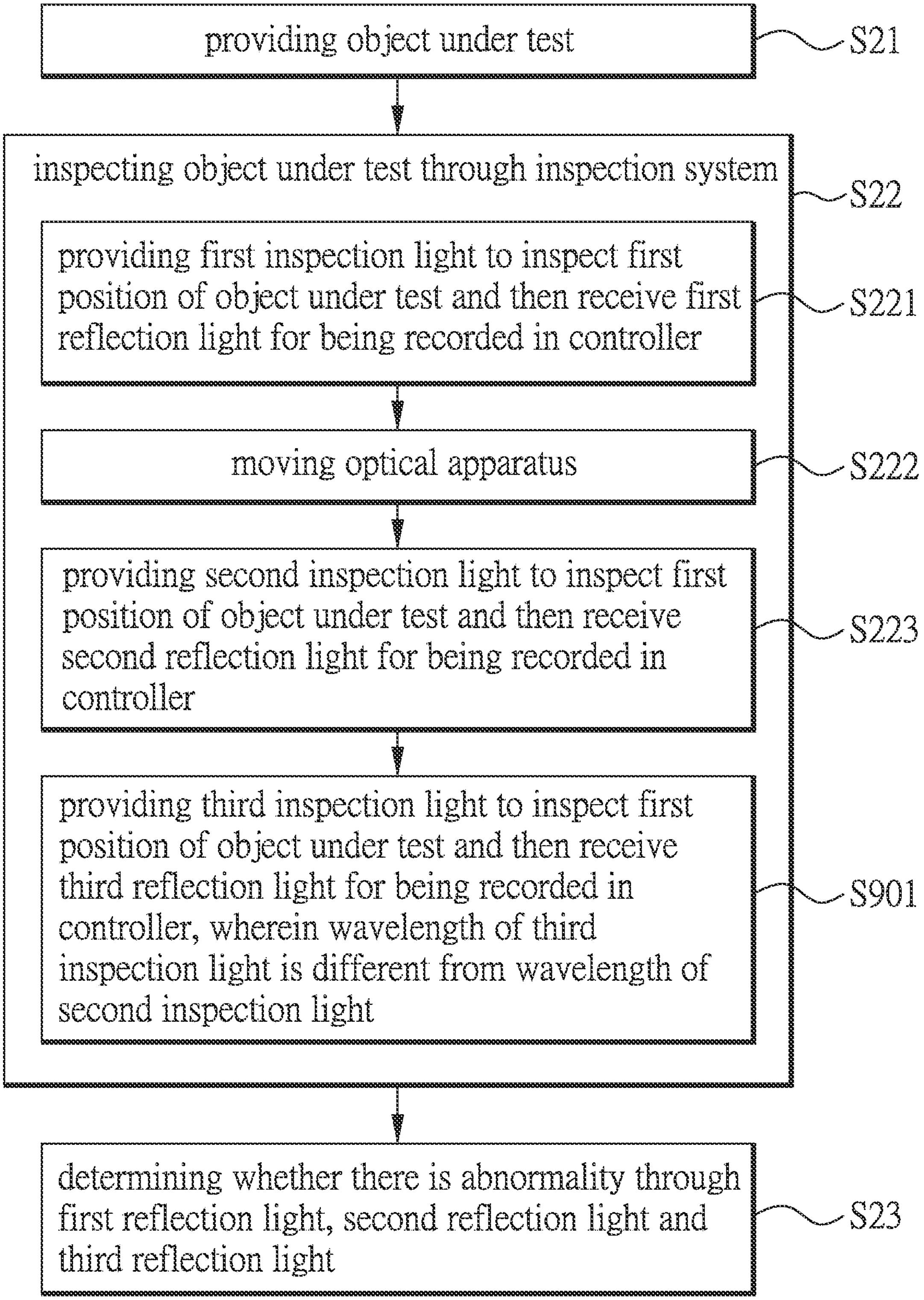
FIG. 9 is a flow chart of the inspection method according to yet another embodiment of the present disclosure.
Figure 10:
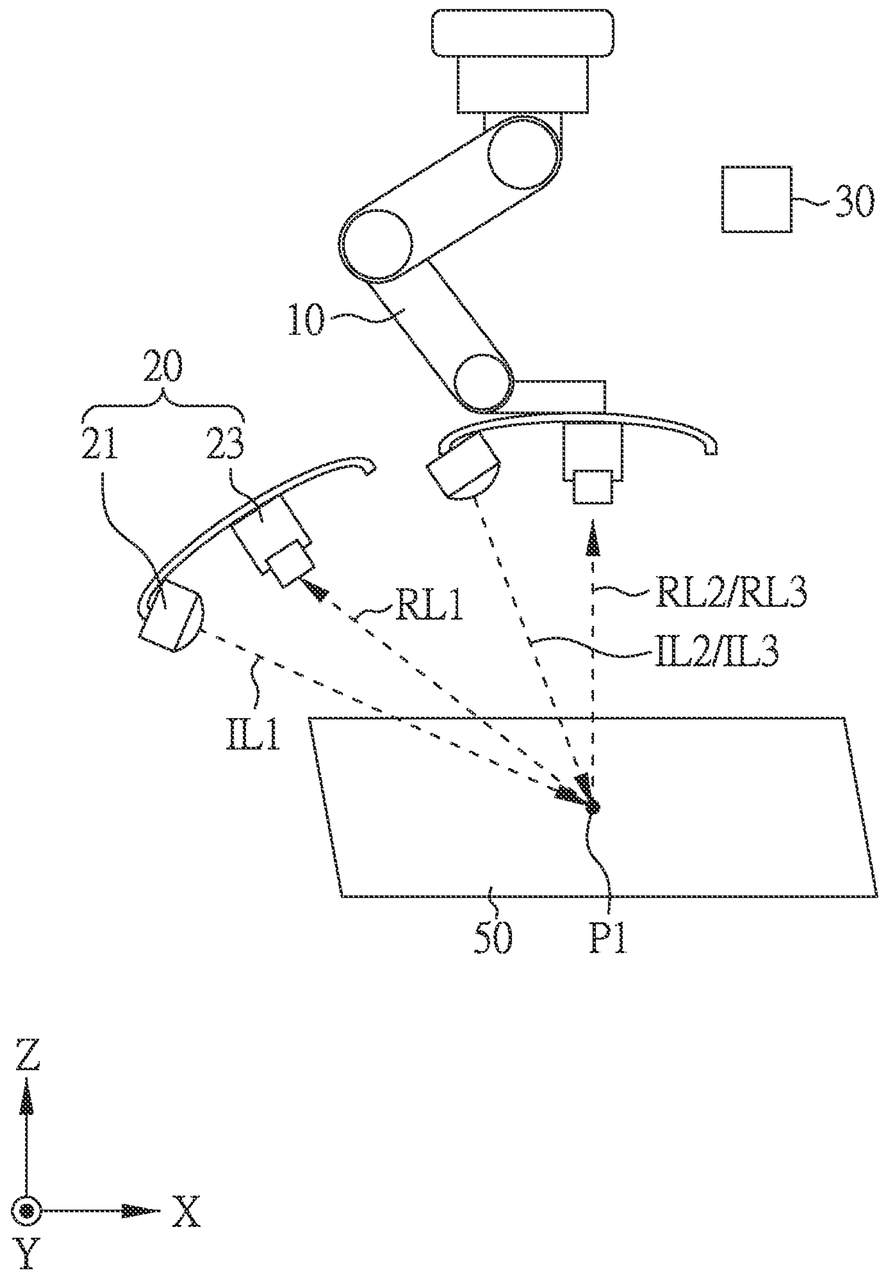
FIG. 10 is a schematic diagram showing the operation of an inspection system corresponding to the inspection method of the present disclosure shown in FIG. 9.

FIG. 9 is a flow chart of the inspection method according to yet another embodiment of the present disclosure, and please also refer to FIG. 10 which is a schematic diagram showing the operation of the inspection system 1 corresponding to the inspection method of the present disclosure, wherein the process of FIG. 9 is similar to that of FIG. 2, and thus only the differences will be described below. In FIG. 9, step S901 is further provided after the step of using the optical apparatus 20 to provide a second inspection light IL2 (that is, step S223), in which the optical apparatus 20 provides a third inspection light IL3 for inspecting the first position P1 of the object 50 under test, and then receives a third reflection light RL3 for being recorded in the controller 30, where the wavelength of the third inspection light IL3 is different from the wavelength of the second inspection light IL2. Moreover, the step of determining whether there is an abnormality (that is, step S23) is made to determine whether there is an abnormality in the object 50 under test through the first reflection light RL1 and the second reflection light RL2, and further through the third reflection light RL3.

Figure 11A:
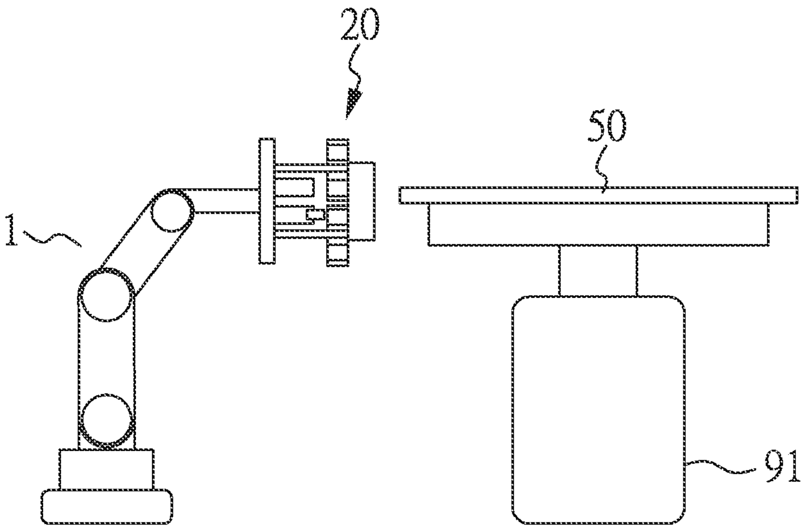
FIG. 11A to FIG. 11C schematically illustrate the inspection method of the present disclosure applied to edge appearance inspection for electronic devices.
Figure 11B:
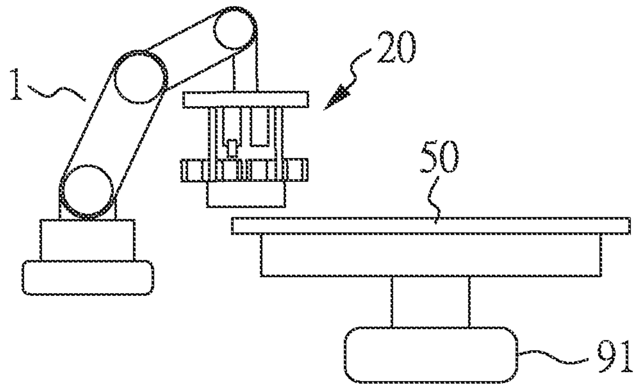
Figure 11C:
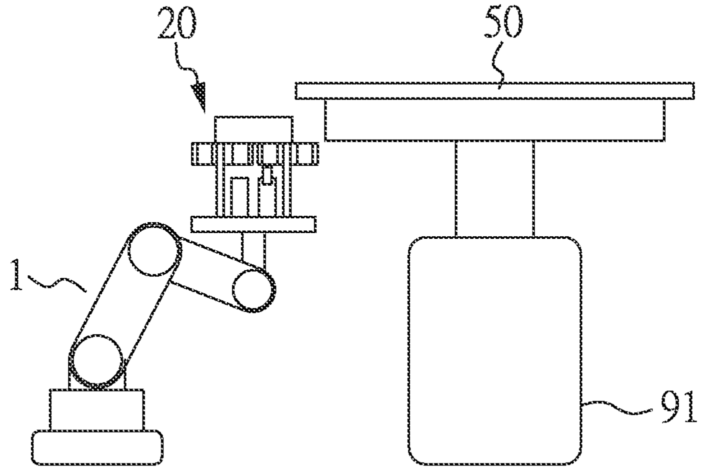

FIG. 11A to FIG. 11C schematically illustrate the inspection method of the present disclosure applied to edge appearance inspection for electronic devices. The optical apparatus 20 of the inspection system 1 may adopt the configuration of FIG. 6A and FIG. 6B and, as shown in FIG. 11A to FIG. 11C, the object 50 under test is disposed on a rotating mechanism 91 and may be rotated by the rotating mechanism 91. The optical apparatus 20 may select a visible light lamp or an invisible light lamp to achieve the effect of inspection with high penetrating power. Since the object 50 under test is disposed on the rotating mechanism 91, the object 50 under test may be, for example, rotated so that one side thereof faces the inspection system 1. Therefore, the optical apparatus 20 may be controlled by the inspection system 1 to inspect the outer edge of the object 50 under test (as shown in FIG. 11A), the upper surface of the object 50 under test (as shown in FIG. 11B), or the lower surface of the object 50 under test (as shown in FIG. 11C). Then, the object 50 under test may be rotated so that the other side thereof faces the inspection system 1 to inspect the object 50 under test, thereby achieving the purpose of inspecting six surfaces (upper, lower, and four sides) of the object 50 under test.

Figure 12:
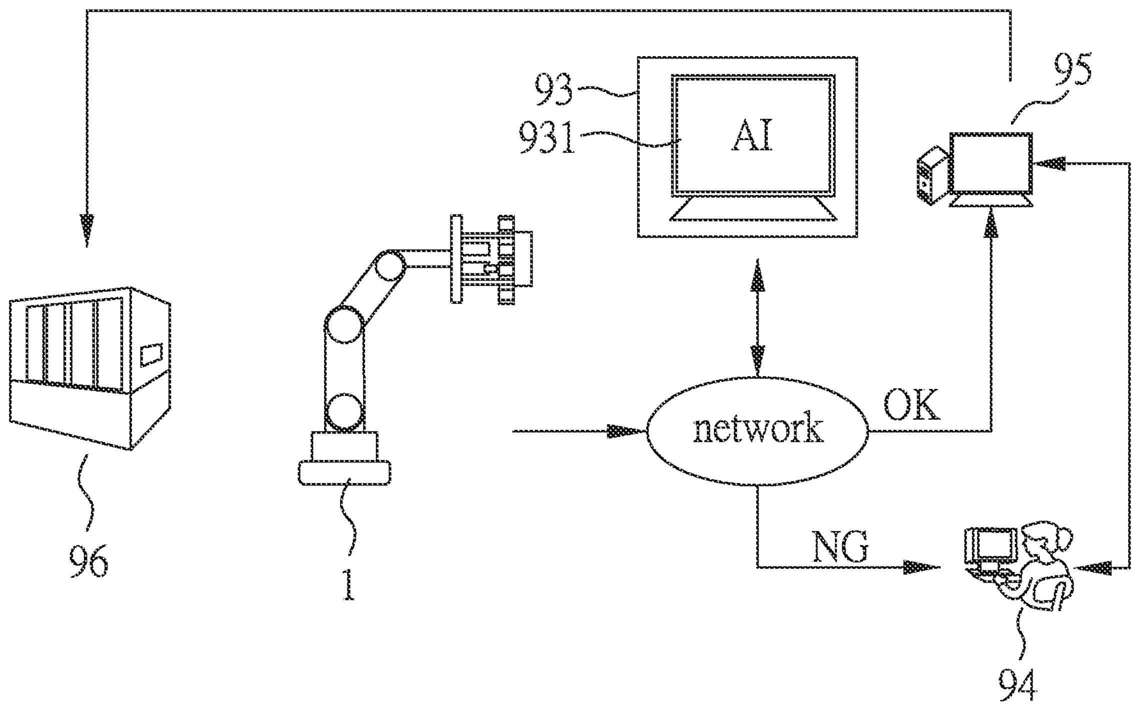
FIG. 12 shows a schematic diagram of the inspection method of the present disclosure applied to process yield optimization.

FIG. 12 shows a schematic diagram of the inspection method of the present disclosure applied to process yield optimization. As shown, the inspection system 1 used in the inspection method of the present disclosure may be equipped with an edge computing system 93 to perform immediate inspection and classification on the photos taken by the camera device 23 of the optical apparatus 20, wherein the edge computing system 93 may have at least one GPU (Graphic Processing Unit) server 931 to perform defect detection and classification through rule base and AI algorithm modeling. If the camera device 23 acquires too much image data, the number of GPU servers 931 may be increased and parallel operations may be used to perform defect detection and classification. If the confidence level calculated by the edge computing system 93 is higher than a predetermined level, which is, for example, but not limited to, 95% (marked as OK in the figure), the inspection result is sent to the file server 95. On the contrary, if the confidence level is lower than the predetermined level (marked as NG in the figure), the inspection result will be automatically sent to the online operator 94 for review, and then the reviewed inspection result will be stored in the file server 95. Furthermore, the inspection results in the file server 95 may also be immediately fed back to the front-process equipment 96 for performing adjustment and optimal process equipment dispatch, thereby optimizing the yield.

Features of various embodiments of the present disclosure may be mixed and matched as long as they do not violate the spirit of the disclosure or conflict with each other.

The aforementioned specific embodiments should be construed as merely illustrative, and not limiting the rest of the present disclosure in any way.

The invention claimed is:

1. An inspection method for electronic devices, comprising the steps of:

providing an object under test;

inspecting the object under test through an inspection system having an optical apparatus including a camera device and a light source device disposed on a robotic arm with multi-axis degree of freedom, wherein positions of the camera device and the light source device are fixed on the optical apparatus, wherein the light source device is a changeable light source device comprising a lamp and a filter wheel, the camera device is disposed at a center of the filter wheel, the lamp is disposed beside the camera device, and a plurality of filters are disposed at a periphery of the filter wheel, the step of inspecting the object under test including the steps of:

using the light source device of the optical apparatus to provide a first inspection light for inspecting a first position of the object under test, and then using the camera device of the optical apparatus to receive a first reflection light for being recorded in a controller;

moving the camera device and the light source device of the optical apparatus; and using the light source device of the optical apparatus to provide a second inspection light for inspecting the first position of the object under test, and then using the camera device of the optical apparatus to receive a second reflection light for being recorded in the controller; and determining whether there is an abnormality through the first reflection light and the second reflection light, wherein the step of inspecting the object under test through an inspection system further includes: moving the camera device and the light source device of the optical apparatus; and using the light source device of the optical apparatus to provide a third inspection light to inspect the first position of the object under test, and then using the camera device of the optical apparatus to receive a third reflection light for being recorded in the controller, wherein whether there is an abnormality is determined through the first reflection light, the second reflection light and the third reflection light; and performing immediate inspection and classification on photos taken by the camera device by an edge computing system, wherein if a confidence level calculated by the edge computing system is higher than a predetermined level, an inspection result is sent to a file server, and if the confidence level is lower than the predetermined level, the inspection result is automatically sent to an online operator for review.

2. The inspection method for electronic devices as claimed in claim 1, wherein there is a first included angle between the first inspection light and a normal direction of the object under test, there is a second included angle between the second inspection light and the normal direction of the object under test, and the first included angle is different from the second included angle.

3. The inspection method for electronic devices as claimed in claim 1, wherein the first inspection light comes from a first light source position in space, the second inspection light comes from a second light source position in space, and the first light source position is different from the second light source position.

4. The inspection method for electronic devices as claimed in claim 1, wherein there is a first included angle between the first inspection light and a normal direction of the object under test, there is a second included angle between the second inspection light and the normal direction of the object under test, there is a third included angle between the third inspection light and the normal direction of the object under test, and the first included angle, the second included angle and the third included angle are different from each other.

5. The inspection method for electronic devices as claimed in claim 1, wherein the first inspection light comes from a first light source position in space, the second inspection light comes from a second light source position in space, the third inspection light comes from a third light source position in space, and the first light source position, the second light source position and the third light source position are different from each other.

6. The inspection method for electronic devices as claimed in claim 1, further comprising, between the step of using the optical apparatus to provide a first inspection light and the step of moving the optical apparatus, the step of: using the optical apparatus to provide a third inspection light for inspecting the first position of the object under test, and then receive a third reflection light for being recorded in the controller, wherein a wavelength of the third inspection light is different from that of the first inspection light, and the step of determining whether there is an abnormality further determines whether there is an abnormality through the third reflection light.

7. The inspection method for electronic devices as claimed in claim 1, further comprising, after the step of using the optical apparatus to provide a second inspection light, the step of: using the optical apparatus to provide a third inspection light for inspecting the first position of the object under test, and then receive a third reflection light for being recorded in the controller, wherein a wavelength of the third inspection light is different from that of the second inspection light, and the step of determining whether there is an abnormality further determines whether there is an abnormality through the third reflection light.

8. The inspection method for electronic devices as claimed in claim 7, wherein there is a first included angle between the first inspection light and a normal direction of the object under test, there is a second included angle between the second inspection light and the normal direction of the object under test, and the first included angle is different from the second included angle.

9. The inspection method for electronic devices as claimed in claim 7, wherein the first inspection light comes from a first light source position in space, the second inspection light comes from a second light source position in space, and the first light source position is different from the second light source position.

10. The inspection method for electronic devices as claimed in claim 1, wherein the optical apparatus is coupled to the controller.

11. An inspection method for electronic devices, comprising the steps of:

providing an object under test;

inspecting the object under test through an optical apparatus having a camera device and a light source device disposed on a robotic arm with multi-axis degree of freedom, wherein positions of the camera device and the light source device are fixed on the optical apparatus, wherein the light source device is a changeable light source device comprising a lamp and a filter wheel, the camera device is disposed at a center of the filter wheel, the lamp is disposed beside the camera device, and a plurality of filters are disposed at a periphery of the filter wheel, the step of inspecting the object under test including:

selecting a first light source of the light source device to provide a first inspection light for inspecting a first position of the object under test, and then using the camera device to receive a first reflection light for being recorded in a controller; and selecting a second light source of the light source device to provide a second inspection light for inspecting the first position of the object under test, and then using the camera device to receive a second reflection light for being recorded in the controller; and determining whether there is an abnormality through the first reflection light and the second reflection light, wherein the first inspection light has a first wavelength, the second inspection light has a second wavelength, and the first wavelength is different from the second wavelength; and performing immediate inspection and classification on photos taken by the camera device by an edge computing system, wherein if a confidence level calculated by the edge computing system is higher than a predetermined level, an inspection result is sent to a file server, and if the confidence level is lower than the predetermined level, the inspection result is automatically sent to an online operator for review.

12. The inspection method for electronic devices as claimed in claim 11, wherein the step of inspecting the object under test through an optical apparatus further includes: selecting a third light source to provide a third inspection light for inspecting the first position of the object under test, and then receiving a third reflection light for being recorded in the controller, wherein whether there is an abnormality is determined through the first reflection light and the second reflection light and further through the third reflection light.

13. The inspection method for electronic devices as claimed in claim 11, wherein the first inspection light has a first wavelength, the second inspection light has a second wavelength, the third inspection light has a third wavelength, and the first wavelength, the second wavelength and the third wavelength are different from each other.

14. The inspection method for electronic devices as claimed in claim 11, wherein the optical apparatus is coupled to the controller.

* * * * *